Oct. 13, 1936.   W. J. WOOD   2,057,222
OIL RING FOR LOCOMOTIVE ROD PINS
Filed Aug. 16, 1935   2 Sheets-Sheet 1
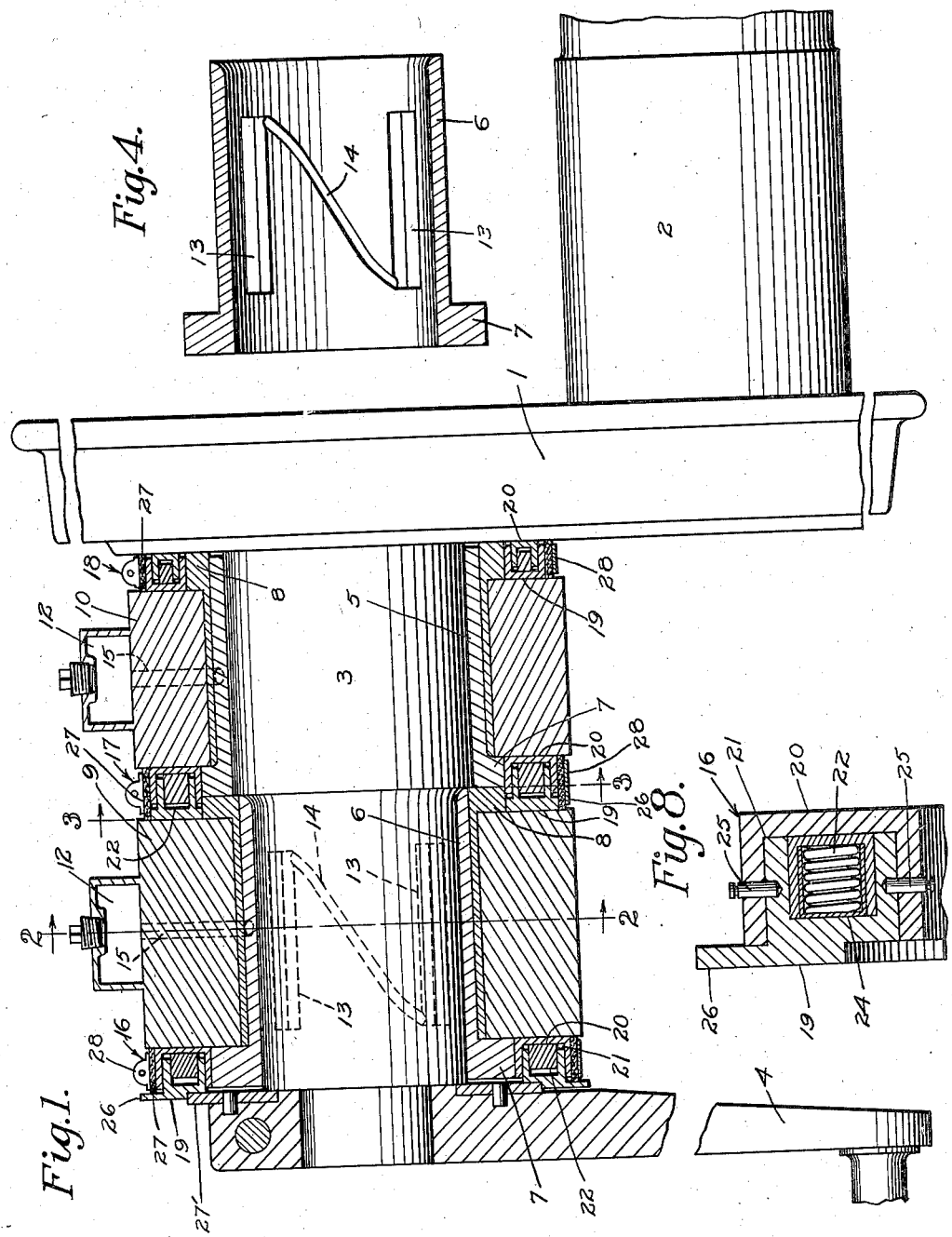
W. J. Wood
INVENTOR
BY Victor J. Evans & Co.
ATTORNEY Oct. 13, 1936.   W. J. WOOD   2,057,222
OIL RING FOR LOCOMOTIVE ROD PINS
Filed Aug. 16, 1935   2 Sheets-Sheet 2
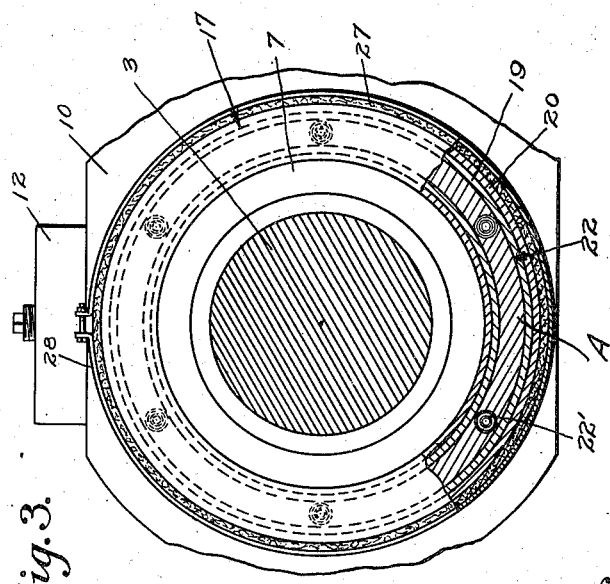
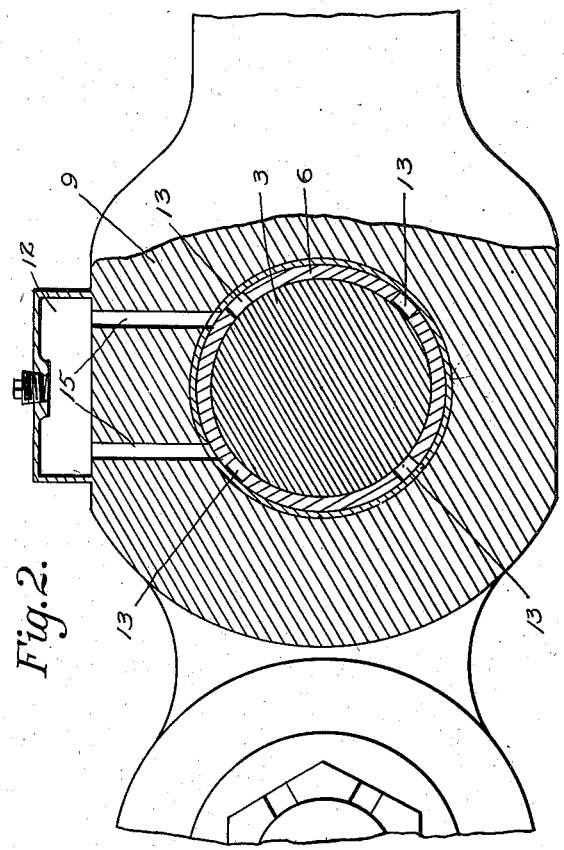
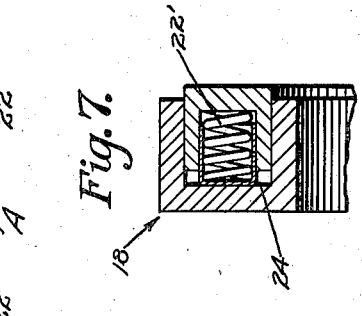
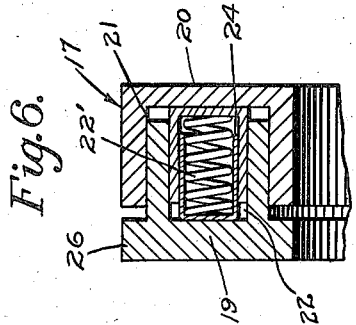
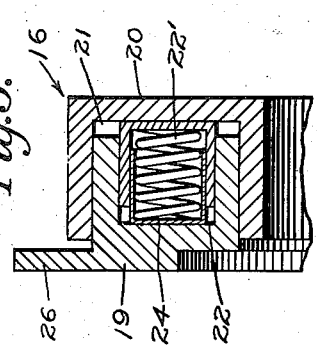
W. J. Wood
INVENTOR
BY Victor J. Evans & Co.
ATTORNEY Patented Oct. 13, 1936

2,057,222

UNITED STATES PATENT OFFICE 2,057,222

OIL RING FOR LOCOMOTIVE ROD PINS

Walter J. Wood, Waverly, N. Y.

Application August 16, 1935, Serial No. 36,592

1 Claim. (Cl. 105—84)

This invention relates to lubricant retainers especially adapted for locomotive drive and connecting rod bearings to permit the use of free flowing lubricant and obviate the necessity of depending on hard grease for lubrication which frequently fails in its purpose and results in the destruction of the bearings and has for the primary object the provision of means which may be readily installed without alteration to locomotive construction and will efficiently prevent escape and waste of free flowing lubricant while the latter is permitted to have free circulation to reduce friction to a minimum and wear incident thereto.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view showing my invention adapted to a locomotive construction.

Figure 2 is a sectional view taken on the line 2—2 of Figure 1.

Figure 3 is a sectional view taken on the line 3—3 of Figure 1.

Figure 4 is a vertical sectional view illustrating one of the bushings.

Figure 5 is a fragmentary vertical sectional view illustrating one of the lubricant containers.

Figure 6 is a fragmentary vertical sectional view illustrating another or second lubricant retainer.

Figure 7 is a fragmentary sectional view illustrating a third lubricant retainer.

Figure 8 is a fragmentary vertical sectional view showing how sections of a lubricant retainer may be held assembled before application to a locomotive construction.

Referring in detail to the drawings, the numeral 1 indicates one of the wheels of a locomotive, the axle thereof being shown at 2, and the drive pin at 3, the latter having secured to its end the usual crank arm 4 employed for operating the valve mechanism of the locomotive. Mounted on the pin 3 are bushings 5 and 6, each having one end flanged, as shown at 7. The other ends of the bushings 5 and 6 have mounted thereon spacers 8 abutting the flanged end of the bushings 5 and 6 and each is in the form of a sleeve having one end flanged. The bushings 5 and 6 and spacers extend through the journaled ends of drive and connecting rods 9 and 10 of the locomotive. This construction is common with locomotives and the drive and connecting rods have a limited endwise movement with respect to the pin 3, frequently termed the laterals of the drive mechanism of the locomotive. It is the practice to employ hard grease for the lubrication of the pin 3 and the bearings of the drive and connecting rods as well as the bushings. This type of lubrication is not efficient due to the fact hard grease will not form a coating to all of the moving and contacting faces, consequently allowing excessive friction to set up and destroy or cause undue wear. In order to permit all moving parts to be thoroughly bathed in free flowing lubricant furnished from reservoirs 12, my invention is employed which consists of lubricant retainers arranged between the main and connecting rod and the connecting rod and the hub of the wheel and the main connecting rod and the crank arm 4. Also the bushings 5 and 6 have longitudinal oil slots 13 connected with one another by lubricant grooves 14. The reservoirs 12 communicate with the slots 13 by passages 15 formed in the journaled ends of the drive and connecting rods, the reservoirs being suitably mounted thereto. One passage 15 of each reservoir permits the lubricant to flow freely to the slots 13 and pass from one to another by way of the grooves 14 and return to said reservoir by the other passage 15 thereby completing the cycle of circulation of the lubricant and which circulation is maintained by the motion of the rods. The lubricant retainers are designated generally by the characters 16, 17 and 18 and are similarly constructed, except for minor details. Each lubricant retainer consists of inner and outer ring sections 19 and 20, the ring section 20 being grooved, as shown at 21, to slidably receive the ring section 19. The ring sections receive therebetween an annular socketed member A to form chambers 22. The annular members A provide a packing or oil seal between the flanged rings 19 and 20. Telescopic spring casings 24 are mounted in the chambers 22 and have therein coil springs 22' acting to force apart the ring sections. To prevent separation of the ring sections prior to application to the locomotive, said ring sections are provided with openings to receive pins 25, which pins can be readily removed after the application of the lubricant retainer to the locomotive. The ring section 19 of the lubricant retainer 16 is equipped with a flange 26, as shown in Figure 5. Surrounding the ring sections of the lubricant retainers are felts 27, or strips made of felt, and which are retained in position by split bands 28, each having its ends adjustably and detachably connected. The felts 27 are wider than the widths of the split bands 28 and they act to prevent the entrance of foreign matter to the ring sections of the lubricant retainers when in use. The lubricant retainer 16 is supported on the flange of the bushing 6 and the ring sections thereof bear against the journaled ends of the drive rod and a face plate 27' secured to the crank arm 4. The lubricant retainer 16 prevents the escape of lubricant between the flanged end of the bushing 6 and the drive rod and the crank arm. The lubricant retainer 17 is positioned between the drive and connecting rods and is supported by the flanged end of the bushing 5 and the spacer 8. The lubricant retainer 18 is positioned between the connecting rod and the hub of the wheel and is supported by a spacer 30 mounted on the bushing 5. Thus it will be seen that the spaces between the drive and connecting rods and the connecting rod and the wheel and the drive rod and the crank arm are effectively sealed to prevent the escape of free flowing lubricant, which lubricant is capable of forming a coating to all relatively movable faces for the purpose of reducing friction to a minimum and consequently obviate wear. Yieldable lubricant retainers of the character described may be readily adapted to a conventional construction of locomotive drive or any other part of a locomotive or similar device wherein it is desired to prevent the escape of free flowing lubricant. Lubricant retainers of this character will permit the drive and connecting rods to have their laterals with respect to the drive pin 3.

Having described the invention, I claim:

In combination with a drive pin of a locomotive drive wheel having secured thereto a valve mechanism drive crank arm and drive and connecting rods mounted on said drive pin, bushings between said drive and connecting rod and the drive pin, each of said rods having a reservoir for a free flowing lubricant and each of said rods having a pair of spaced passages for directing the lubricant from the reservoir to the bushings, drive pin and said drive and connecting rod, each of said bushings having longitudinal oil receiving slots for the passage of the oil and inner grooves between said slots whereby the oil delivered through one passage from the reservoir into one slot of the bushing will be scooped in the second slot in the bushing and redelivered through the second passage from the reservoir back into said reservoir, and lubricant sealing mediums arranged between the drive wheel, connecting rod and the latter and the drive rod and the latter and the crank arm and each including inner and outer ring sections having edge flanges received one in the other, an annular member between the flanges of the inner ring member and spaced casings having coiled expansion springs therein movable by such springs to force the annular member against the inner wall of the inner ring.

WALTER J. WOOD.